United States Patent
Kemp

(10) Patent No.: US 12,301,927 B2
(45) Date of Patent: May 13, 2025

(54) SYSTEMS AND METHODS FOR MULTI-SOURCE RECORDING OF CONTENT

(71) Applicant: DISH NETWORK L.L.C., Englewood, CO (US)

(72) Inventor: Geoffrey Kemp, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/713,584

(22) Filed: Dec. 13, 2019

(65) Prior Publication Data

US 2021/0185387 A1    Jun. 17, 2021

(51) Int. Cl.
| | |
|---|---|
| H04N 21/433 | (2011.01) |
| G06N 20/10 | (2019.01) |
| H04N 21/24 | (2011.01) |
| H04N 21/25 | (2011.01) |
| H04N 21/475 | (2011.01) |
| H04N 21/482 | (2011.01) |

(52) U.S. Cl.
CPC ......... *H04N 21/4334* (2013.01); *G06N 20/10* (2019.01); *H04N 21/2408* (2013.01); *H04N 21/251* (2013.01); *H04N 21/4753* (2013.01); *H04N 21/4821* (2013.01)

(58) Field of Classification Search
CPC .......... H04N 21/4334; H04N 21/2408; H04N 21/4821; H04N 21/251; H04N 21/4753; G06N 20/10
See application file for complete search history.

(56) References Cited

U.S. PATENT DOCUMENTS

| | | |
|---|---|---|
| 6,324,338 B1 | 11/2001 | Wood et al. |
| 7,151,886 B2 | 12/2006 | Young et al. |
| 7,380,264 B2 | 5/2008 | Potrebic |
| 7,412,150 B2 | 8/2008 | Nishikawa et al. |
| 7,477,832 B2 | 1/2009 | Young et al. |

(Continued)

*Primary Examiner* — Kunal Langhnoja
(74) *Attorney, Agent, or Firm* — Perkins Coie LLP

(57) ABSTRACT

The present disclosure is directed to systems and methods for multi-source recording of content. Program data associated with a plurality of programs may be received. Program data may comprise a channel, a series of shows, a group of movies, a broadcast media item, and/or an Internet streaming media item. Each program may be associated with at least one channel and transmission source. The transmission source may comprise an Internet-streaming service, a digital video recorder, and/or an on-demand library, among other transmission sources. Data corresponding to a first program from a first channel and a first transmission source may be recorded. Data corresponding to a second program from the first channel and a second transmission source may also be recorded. The first program and second program may then be displayed within a channel-specific view of a program guide that obscures or removes identification of the first and second transmission sources. In other embodiments, the recording of the program data from the first and/or second program may be initiated by at least one machine-learning system that records program data based on a user's past viewing history. The multi-source recording system may be configured to record entire channels and avoid recording duplicates.

20 Claims, 10 Drawing Sheets

(56) References Cited

U.S. PATENT DOCUMENTS

| | | |
|---|---|---|
| 7,543,325 B2 | 6/2009 | Westbrook et al. |
| 7,614,076 B2 | 11/2009 | Ono et al. |
| 7,657,156 B2 | 2/2010 | Yoo |
| 7,657,912 B2 | 2/2010 | Zhao et al. |
| 7,779,446 B2 | 8/2010 | Westbrook et al. |
| 7,844,990 B2 | 11/2010 | Takagi et al. |
| 8,170,398 B2 | 5/2012 | Fukui |
| 8,213,777 B2 | 7/2012 | Irikuchi et al. |
| 8,233,764 B2 | 7/2012 | Kita et al. |
| 8,321,901 B2 | 11/2012 | Westbrook et al. |
| 8,406,603 B2 | 3/2013 | Daigle et al. |
| 8,417,098 B2 | 4/2013 | Yamada |
| 8,429,689 B2 | 4/2013 | Nishimura et al. |
| 8,429,698 B2 | 4/2013 | Hayashi et al. |
| 8,437,600 B2 | 5/2013 | Onomatsu |
| 8,464,296 B2 | 6/2013 | Knudson et al. |
| 8,464,309 B2 | 6/2013 | Barton |
| 8,615,573 B1 * | 12/2013 | Walsh ................ H04N 21/2743 707/777 |
| 8,627,371 B2 | 1/2014 | White et al. |
| 8,660,412 B2 | 2/2014 | Kummer et al. |
| 8,732,764 B2 | 5/2014 | Kummer et al. |
| 8,781,295 B2 | 7/2014 | Lefevre et al. |
| 8,819,761 B2 | 8/2014 | Minnick |
| 8,910,222 B2 | 12/2014 | Pfeffer et al. |
| 8,989,562 B2 | 3/2015 | Kummer et al. |
| 8,995,817 B2 | 3/2015 | Bhogal et al. |
| 8,997,153 B2 | 3/2015 | Templeman |
| 9,031,385 B2 | 5/2015 | Casagrande et al. |
| 9,032,445 B2 | 5/2015 | Knudson et al. |
| 9,043,843 B2 | 5/2015 | Templeman et al. |
| 9,043,844 B2 | 5/2015 | Knudson et al. |
| 9,154,721 B2 | 10/2015 | Gratton |
| 9,202,524 B2 | 12/2015 | Martch et al. |
| 9,282,278 B2 | 3/2016 | Xu et al. |
| 9,361,940 B2 | 6/2016 | Minnick |
| 9,386,338 B2 | 7/2016 | Mcsweeney et al. |
| 9,412,413 B2 | 8/2016 | Martch |
| 9,479,810 B2 | 10/2016 | Gordhan |
| 9,479,815 B2 | 10/2016 | Gupta et al. |
| 9,479,840 B2 | 10/2016 | Knudson et al. |
| 9,489,981 B2 | 11/2016 | Templeman et al. |
| 9,521,461 B2 | 12/2016 | Knudson et al. |
| 9,584,754 B2 | 2/2017 | Rosenfeld |
| 9,674,577 B1 | 6/2017 | Barton et al. |
| 9,681,176 B2 | 6/2017 | Mountain |
| 9,807,441 B2 | 10/2017 | Gordhan |
| 10,171,861 B2 | 1/2019 | Minnick |
| 2002/0118954 A1 | 8/2002 | Barton et al. |
| 2002/0184635 A1 * | 12/2002 | Istvan ................ H04N 21/4821 725/51 |
| 2006/0078274 A1 | 4/2006 | Miyazawa |
| 2006/0193599 A1 | 8/2006 | Thijssen |
| 2008/0148315 A1 | 6/2008 | Nishikawa et al. |
| 2008/0235739 A1 | 9/2008 | Coebergh |
| 2009/0320072 A1 * | 12/2009 | McClanahan .......... H04N 21/47 725/47 |
| 2010/0211976 A1 | 8/2010 | Chiu et al. |
| 2011/0026903 A1 | 2/2011 | Padi et al. |
| 2011/0310305 A1 * | 12/2011 | Alexander ......... H04N 21/4135 348/725 |
| 2012/0131628 A1 | 5/2012 | Janning et al. |
| 2014/0006951 A1 * | 1/2014 | Hunter ................ H04N 21/431 715/719 |
| 2014/0126890 A1 * | 5/2014 | Engeli ................ H04N 21/4583 386/296 |
| 2014/0189721 A1 * | 7/2014 | Zaveri ................ H04N 21/4532 725/14 |
| 2017/0034584 A1 | 2/2017 | Casagrande et al. |
| 2017/0332119 A1 * | 11/2017 | Casagrande ............ H04L 67/02 |
| 2018/0167681 A1 | 6/2018 | Jeon et al. |
| 2018/0332350 A1 | 11/2018 | Mountain |

\* cited by examiner

| Guide | TODAY | 6:30p | 11:00p | 11:30p | 12:00a |
|---|---|---|---|---|---|
| 116 Channel F HD | | x | x | x | x |
| 114 Channel E HD | | x | x | x | x |
| 113 Channel D HD | | x | x | x | x |
| 112 Channel C HD | | Program A | Program B | Program C | Program A |
| 111 Channel B HD | | x | x | x | x |
| 110 Channel A HD | | x | x | x | x |

| Guide | | | | | |
|---|---|---|---|---|---|
| TODAY | 6:30p | 11:00p | 11:30p | 12:00a | |
| 116 Channel F HD | x | x | x | x | |
| 114 Channel E HD | x | x | x | x | |
| 113 Channel D HD | x | x | x | x | |
| 112 Channel C HD | Program D | Program B | Program C | Program A | Selection Available On-Demand |
| 111 Channel B HD | x | x | x | x | |
| 110 Channel A HD | x | x | x | x | |

902 — Program A
904 — Selection Available On-Demand
900

SYSTEMS AND METHODS FOR MULTI-SOURCE RECORDING OF CONTENT

TECHNICAL FIELD

The present disclosure is related to the field of electronic programming guides and multimedia streaming/recording processes.

BACKGROUND

Modern televisions, streaming services, and set-top boxes have the ability to record selected multimedia items. In order to record these multimedia items, a user today typically must manually select each program that the user desires to record. This results in inefficient and time-consuming channel surfing and searching. Moreover, a user may select a particular program to record but not realize that program will be recorded during primetime television—a time when the user may want to view a different program. This results in a viewing conflict, as the live television stream the user may want to watch now requires the use of at least one tuner from a set-top box, and the recording of the program that the user wants to view in the future also requires the use of at least one tuner. In an example where only one tuner is available at a certain time, a user may have to decide whether to cancel recording the program that the user wants to watch at a future date in lieu of watching the live program or forego watching the live program in lieu of recording the other program to be viewed in the future. As such, during times of high-utilization of tuners, recordings of programs that a user may want to view in the future may be compromised. Modern television recording software fails to account for such deficiencies.

Furthermore, if a user desires to record certain movies or programs from a particular channel, the user is typically constrained to the option of recording the whole channel's program lineup, rather than particular media items, unless the user manually walks through the program lineup and selects each individual multimedia item to record. Current systems and methods of recording multimedia streams do not account for duplicate recordings or recordings during high-utilization times (e.g., primetime). Additionally, current recording technology fails to account for supplemental media services, such as on-demand streaming services. For instance, if a user wants to record a particular program that is scheduled to air on live television, current systems and methods will allow the user to make that selection, and the program will subsequently be recorded—even though that program may already exist as an on-demand selection either through a cable package and/or Internet-based streaming service.

With regard to storing multimedia recordings, most DVR devices do not alert a user about storage constraints until after a certain multimedia item is recorded and saved to the DVR. This results in inefficient recording processes and potential storage bloat that can decrease processing speed and over-utilize network resources.

As such, there is an increased need for systems and methods that can address the challenges of recording multimedia items based on user preferences, tuner-utilization timeframes, storage constraints, cross-communication between set-top boxes and Internet-based streaming services, and other deficiencies with today's multimedia recording technology.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

FIG. 6 illustrates an example electronic program guide indicating scheduled recordings based on the systems and methods disclosed herein.

FIG. 9 illustrates an example electronic program guide and a predictive storage notification, as described herein.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with intelligent recording of multimedia items that consider tuner-utilization, storage constraints, and user preferences, among other variables. Currently, modern recording technology forces users to manually select channels that they want to record for future viewing. This results in a tedious and time-consuming task. Furthermore, modern digital video recording technology does not account for duplicate recordings or storage constraints. Additionally, modern digital video recording technology fails to interact with Internet-streaming services and consider other sources of multimedia items that a user may desire to record.

Accordingly, the present disclosure provides a plurality of technical benefits including but not limited to: enabling more efficient and less-bandwidth recording; lower utilization of set-top box tuners; more efficient storage management; and enabling digital video recorders (DVR) and other multimedia recording systems to record relevant multimedia items based on machine-learning algorithms, among other examples.

Figure 1:
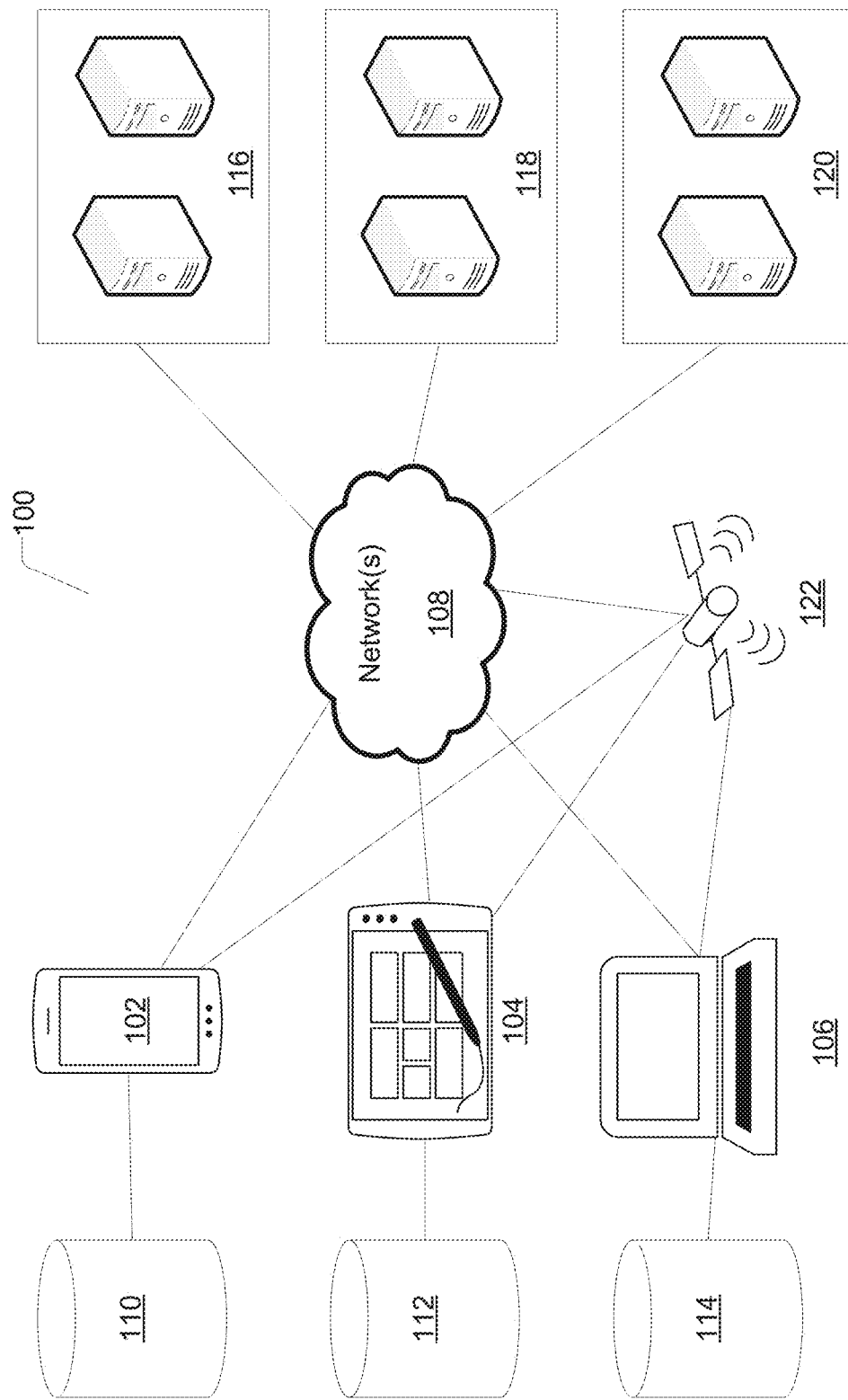
FIG. 1 illustrates an example of a distributed system for recording multimedia items, as described herein.

FIG. 1 illustrates an example of a distributed system for recording multimedia items. Example system 100 presented is a combination of interdependent components that interact to form an integrated whole for recording multimedia items. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to identify and record multimedia items. In aspects, a client device, such as client devices 102, 104, and 106, may have access to one or more data sources and/or databases comprising multimedia items. In other aspects, client devices 102, 104, and 106, may be equipped to receive live broadband and/or satellite signals carrying multimedia items to be displayed on a display device, such as a television or client devices 102, 104, and 106. The signals that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run multimedia recording software that may be stored locally on the client device or run remotely via network(s) 108. For example, a client device may receive a signal from satellite 122 containing a particular multimedia item to be recorded. The client device may record the multimedia item and subsequently store the multimedia item locally in databases 110, 112, and/or 114. In alternative scenarios, the multimedia item that is recorded may be transmitted from a client device (e.g., client device 102, 104, and/or 106) via network(s) 108 to be stored remotely on server(s) 116, 118, and/or 120. A user may subsequently access the recorded multimedia item from a local database (110, 112, and/or 114) and/or external database (116, 118, and/or 120), depending on where the recorded multimedia item may be stored.

In some example aspects, the multimedia recording software running on client device(s) 102, 104, and/or 106 may be configured to receive an electronic programming guide (EPG) via network(s) 108 and/or satellite 122. The EPG may display which multimedia items are scheduled to air at which times. Further, because the client devices 102, 140, and/or 106, network(s) 108, and satellite 122 are all configured to communicate with one another, the multimedia recording software described herein may be able to discern the most efficient time to record a particular multimedia item. For instance, a client device may comprise a set-top box that is configured to communicate to a display device (e.g., television) and a satellite 122. A user may initiate a request through a user interface of the multimedia recording software that prompts the multimedia recording system described herein to record a certain multimedia item. The multimedia recording system may evaluate the current tuner utilization of the set-top box, the EPG (which displays when the multimedia item will air), and current storage limitations, among other factors. For instance, if a user desired to record a multimedia item that, according to the EPG, was airing at 7 pm and 1 am, the multimedia recording system may determine that recording the multimedia item at 1 am instead of 7 pm may be more efficient because at 7 pm, the user may be currently viewing a live television program, which utilizes at least one of the tuners equipped to a set-top box. In environments of multiple devices using multiple tuners, attempting to record a multimedia item during "prime time" may interfere with tuner utilization, forcing users to choose whether to watch live television or to record a program for future viewing.

In other example aspects, the multimedia recording system running on client device(s) 102, 104, and/or 106 may receive a user request to record a certain channel's programming lineup in full. The systems and methods described herein may be able to receive EPG data, e.g., from network(s) 108 and/or satellite 122 and determine where particular programs may be duplicative and ensure that single instances of programs are recorded in order to ensure low-use of local and/or external memory.

In yet further example aspects the multimedia recording systems and methods described herein may be configured to record multimedia items based on at least one machine-learning algorithm trained on at least one dataset reflecting a user's multimedia viewing preferences. The at least one machine-learning algorithms (and models) may be stored locally at databases 110, 112, and/or 114 and/or externally at databases 116, 118, and/or 120. Client devices 102, 104, and/or 106 may be equipped to access these machine learning algorithms and intelligently select particular multimedia items to be recorded based on at least one machine-learning model that is trained on a user's historical viewing history. For example, if a user frequently watches a show on the History channel, the user's viewing history may be collected to train a machine-learning model to then automatically record certain shows on the History channel. In other example aspects, a user may demonstrate a preference for certain genres, actors, time periods, geographies, etc. The multimedia recording systems and methods described herein may implement at least one machine-learning algorithm that was trained on a dataset reflecting a user's preferences regarding genres, actors, time periods, and geographies, among other factors. The systems and methods described herein may then automatically select particular multimedia items to record for future viewing.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user viewing history and other data stores of user preferences (e.g., social media profiles) to determine which multimedia content should be automatically recorded, or, in some examples, suggested to the user for recording. Determining whether a certain multimedia item should be recorded may comprise identifying various characteristics of a user's viewing history and preferences. For instance, if a user has a social media profile that displays several photographs of the user engaging in sports, then the multimedia recording system described herein may determine that certain program from sports channels (e.g., ESPN)

should be recorded. Similarly, if a user posts certain social media items reflecting a favorite sports team, the multimedia recording system may determine that games in which that specific team is playing should be recorded (e.g., in some instances, as long as that game is not being viewed live by the user). Based on an aggregation of data from a user's viewing history, social media profiles, and other user data stores, at least one ML model may be trained and subsequently deployed to automatically record and/or suggest for recording multimedia items that a particular user may enjoy viewing at a later time.

The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with multimedia information and channel guides. In such examples, the ML model may be locally cached by the client device.

Because satellite 122 and network(s) 108 are configured to communicate with one another, the systems and methods described herein may be able to assess when a particular multimedia item that is scheduled to air on live television (via satellite 122) may already be available on-demand via an Internet-streaming service through network(s) 108. For instance, a user may request that a certain multimedia item be recorded based on the user viewing an EPG. However, the multimedia recording system described herein may first cross-check any Internet-streaming service libraries to which the user may already be subscribed, in addition to checking any on-demand libraries that may exist in a DVR (stored locally at 110, 112, and/or 114 and/or remotely at servers 116, 118, and/or 120). In such situations, a notification may display on a client device 102, 104, and/or 106 informing the user that the requested multimedia item to record is available for viewing through another platform (e.g., DVR on-demand library, Internet-streaming service library, etc.).

Figure 2:
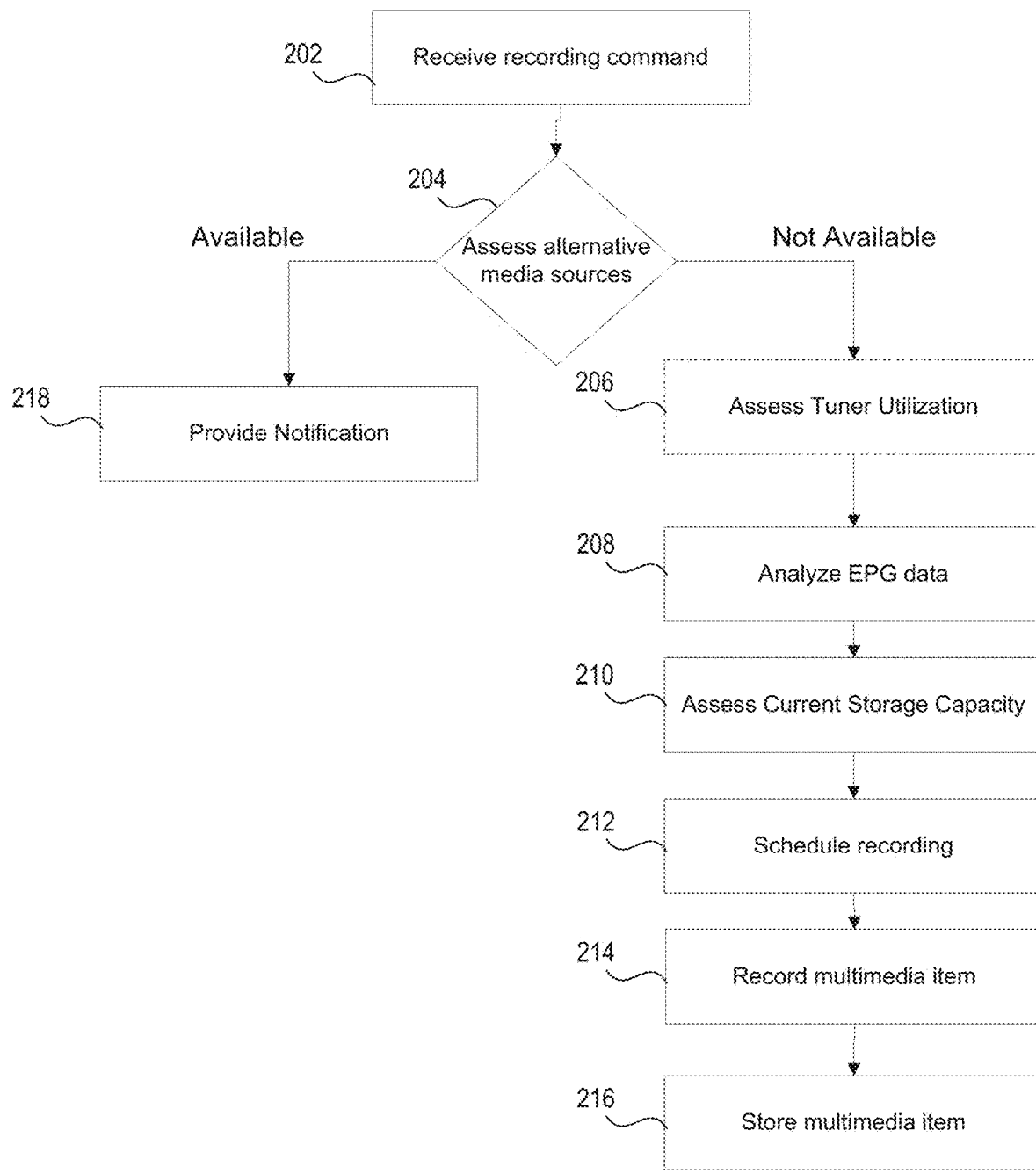
FIG. 2 illustrates an example method for recording multimedia items, as described herein.

FIG. 2 illustrates an example method for recording multimedia items, as described herein. The method begins with step 202 where a command to record a particular multimedia item is received. The command to record a particular multimedia item may be received on a client device, such as client devices 102, 104, and/or 106. In other example aspects, the command may be received via a remote (i.e., channel changer) that communicates with a display device, such as a client device and/or a television. For instance, a user may use buttons affixed to a remote to scroll through a list of programs to select a certain multimedia program or a channel. In some example aspects, the command may be received via text input and/or voice input. For instance, in some examples, a remote may be equipped with a microphone and a recording device that may capture a user's verbal command, transmit the command to a device connected to the Internet, and process the verbal command using vocal recognition techniques. In other aspects, a command may be received via text from a mobile phone. For instance, a user may open a mobile application that corresponds to a satellite television service and/or Internet-streaming service to which the user may be subscribed. The user may indicate within the mobile application via text that a certain upcoming program should be recorded.

In some examples, the recording command may be associated with a single multimedia item. In other examples, the recording command may be associated with an entire channel and/or a series. For instance, a user may desire to record an entire channel's programs for a certain duration (and/or until a storage capacity is reached). A specific example may be if a user desires to record the Hallmark® channel so that a user can watch Hallmark movies at a certain date in the future. In other instances, a user may desire to record a television series. For example, if a television series is airing multiple episodes on a particular channel, a user may command that the multimedia recording system record the upcoming episodes of the specific television series. It should be appreciated that the multimedia recording system described herein is configured to avoid recording duplicates, so in the scenario where a particular channel is requested to be recorded, any re-runs of already-recorded multimedia will be skipped over and not be recorded.

Once command 202 is received, the method proceeds to decision step 204, where the multimedia recording system assesses alternative media sources. Step 204 involves the multimedia recording system cross-checking other media sources for the requested recording received in step 202. For instance, a user may command that a certain program be recorded on a live television streaming service in step 202. The multimedia recording system described herein may assess whether the specified program from step 202 also exists on an Internet-streaming service (e.g., Netflix, Hulu, Roku, etc.) and/or on-demand library for viewing at a future date. If the multimedia system detects that the selected multimedia program/channel/series/etc. exists in a database through an Internet-streaming service to which the user is already subscribed and/or in a satellite on-demand library to which the user already has access, then the method may proceed to step 218, where a notification of the multimedia item's existence is provided to the user on a display device. For example, a user may initiate a request at step 202 to record multiple upcoming episodes of a television show, but the television show may already be available to stream on-demand from an on-demand library and/or Internet-streaming service. Notification 218 may provide such information to a user after the user imitates the request to record at step 202.

The notification of step 218 may be displayed as a pop-up text box (as displayed in FIG. 8) and/or as a verbal notification (e.g., via voice assistant technology). At step 218, a user may acknowledge the notification and decide whether to override the notification and proceed with recording the multimedia item notwithstanding the fact that it already exists pre-recorded via an alternative media source (e.g., Internet-streaming and/or on-demand library), or the user may elect to acknowledge the notification and forgo the recording command.

At decision block 204, if the alternative media sources do not have the multimedia item(s) recorded or available for on-demand streaming (e.g., via DVR and/or Internet-streaming), then the method may proceed to step 206. At step 206, the multimedia recoding system may assess tuner utilization of a set-top box. Step 206 is optional, as it applies to instances of set-top boxes with tuners. Tuner, as the term is used herein, refers to a device that converts a radio frequency analog television or digital television transmission into audio and video signals which can be further processed to produce sound and a picture. In some set-top boxes, the number of tuners may determine how many signals may be received by the set-top box for both viewing live television programs and recording television programs. For example, if a user wanted to watch a live satellite television program and simultaneously record another program airing live on television, two tuners would be required to capture both of those satellite signals and process the sound and video—one for immediate display (live television) and one for future display (recorded program). As such, the multimedia recording system described herein takes into account tuner utilization and capacity when determining when to record a requested multimedia item(s).

Specifically, if a user requests that a certain multimedia program be recorded, the multimedia recording system may first communicate with any set-top boxes to determine if a tuner is currently available and unused. If a tuner is available, the method may proceed to record the requested multimedia item. However, if all tuners are being used and/or a relatively low number of tuners are available (e.g., one tuner available out of five tuners), the multimedia recording system may determine that the tuner utilization is too high to begin a recording of a multimedia item from a satellite signal at that time.

In some examples, tuner utilization may be associated with particular times of day. A high tuner utilization may occur during primetime television, whereas a low tuner utilization may occur in the early hours of the morning. The multimedia recording system described herein may record and store viewing patterns and assess when tuners are utilized the most often. A default setting may indicate that high tuner utilization is during primetime television (e.g., 8 pm-11 pm EST). However, a user may not watch television during that time and instead watch most live television between the hours of 11 pm-2 am EST. The multimedia recording system described herein may notice such viewing patterns and, over time, associate high tuner utilization with the 11 pm-2 am EST time block, while associating low tuner utilization during standard primetime of 8 pm-11 pm EST.

The method then proceeds to step 208, where the electronic programming guide data is analyzed. In some instances where a set-top box is not used and/or a television tuner is not used, the method proceed from decision block 204 directly to step 208. At step 208, EPG data is analyzed to determine the most efficient time slot to record the requested multimedia item or items from step 202. For example, the requested multimedia item to be recorded from step 202 may be airing at 8:30 pm EST and also 1:30 am EST. Because primetime television is between 8 pm and 11 pm EST, the multimedia recording system may elect to record the program at 1:30 am EST when less tuner utilization and/or lower bandwidth usage is likely to occur. However, as described previously, a user's viewing patterns may affect when lower tuner utilization rates and lower bandwidth times occur. If a user frequently watches television between 11 pm and 2 am EST, then the multimedia recording system described herein may intelligently select the 8:30 pm EST showing of the multimedia item to record. In other instances, the EPG data may indicate that a certain multimedia item is only airing during a single time block. In such instances, the multimedia recording system may alert the user and request the user re-confirm the user's desire to record the program at that particular time.

In other instances, the EPG data may indicate that the request multimedia item is airing during another television show that a user has recently been watching live. The multimedia recording system may recognize this conflict and search the EPG for another airing of the requested program. The search may include searching for a later airing time on a particular channel or another airing of the multimedia item on a different channel.

After analyzing the EPG data, the method proceeds to assess current storage capacity. For example, a user's DVR may be near capacity with other recorded multimedia items. Prior to initiating the recording the of the multimedia item, the multimedia recording system may assess the current storage capacity, estimate the total additional storage that will occur from the requested recording, and assess whether the storage capacity is sufficient to store the requested multimedia item. In other words, the multimedia recording system may provide a predictive storage assessment and notification to the user prior to the multimedia item being recorded and stored in a recording database (e.g., DVR). In scenarios where storage capacity may be close to full, the system described herein may notify the user at step 210 that storage needs to be freed up in order for the system to record and store the requested multimedia item(s) from step 202. The user may elect to manually free up storage and/or the user may allow the multimedia recording system to free up storage based on time (e.g., oldest multimedia items are deleted, i.e., first-in first-out storage), based on storage (e.g., largest storage multimedia items are deleted first), and/or based on relevance in light of user viewing histories and preferences (e.g., using at least one ML model to analyze the current DVR or other multimedia recording library and determine which multimedia items are least relevant and subsequently remove them from storage), and/or a combination of the aforementioned storage techniques, among others.

After the storage capacity is assessed at step 210 and sufficient storage is determined to exist for the requested multimedia item(s), the method may proceed to step 212. At step 212, the requested multimedia item(s) may be scheduled for recording, considering factors such as tuner utilization, EPG data, and storage capacity, among other factors.

When the multimedia item is aired live (e.g., via satellite television and/or live-stream via Internet), the multimedia item is recorded at step 214. Once the recording is complete, the multimedia item may be stored at step 216 for future viewing by the user. A notification that the recording has completed successfully may be provided to the user at step 216.

Figure 3:
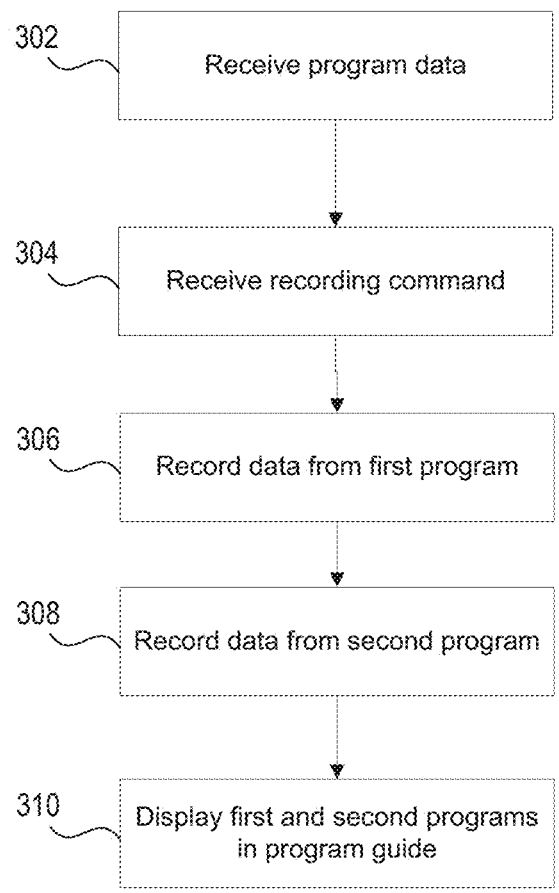
FIG. 3 illustrates an example method for receiving and recording program data.

FIG. 3 illustrates an example method for receiving and recording program data. FIG. 3 begins at operation 302, where program data is received by a device (e.g., mobile device, set-top box, computer, etc.). The program data may identify a plurality of programs, wherein each program is associated with at least one channel and one transmission source. A transmission source may be an Internet-streaming service, a digital video recorder, a broadband service, a cable service, and/or an on-demand media library. At step 304, a recording command may be received from a user. As described previously, a recording command may be received from a client device, a mobile phone, a computer, a remote, a television, a remote web server, and/or a set-top box. Further, the recording command may be in the form of a mechanical input, a verbal input, a text-based input (e.g., text message), and/or a gesture (e.g., a swipe on a screen, a movement in front of a motion-capture camera, etc.). In some aspects, the recording command may identify a particular program and/or a particular channel. For example, a user may want to record all programs playing on the Hallmark channel. In another example, a user may want to record all programs from the Hallmark channel that are airing on other channels besides the Hallmark channel (e.g., a Hallmark movie playing on a different channel). At step 306, data from a first program may be recorded. The data from the first program may correspond to a particular channel and a transmission source. For instance, the first program may be a Hallmark movie that is playing on the Hallmark channel and being transmitted via satellite. At step 308, a second program may be recorded. The second program may also be associated with the Hallmark channel but may not be airing on the Hallmark channel. Rather, the second program may be transmitted via an Internet-streaming video service. At step 310, the first and second programs that were recorded may be displayed in an electronic program guide. The program guide may have a channel-specific view. For instance, a user wanting to view all recorded media items associated with the Hallmark channel may see the first and second programs, even though the first program was recorded from a different transmission source (satellite TV) than the second program (Internet-streaming service). In some aspects, the display of the program guide may hide or obscure the identification of the transmission sources of the first and second programs.

Figure 4:
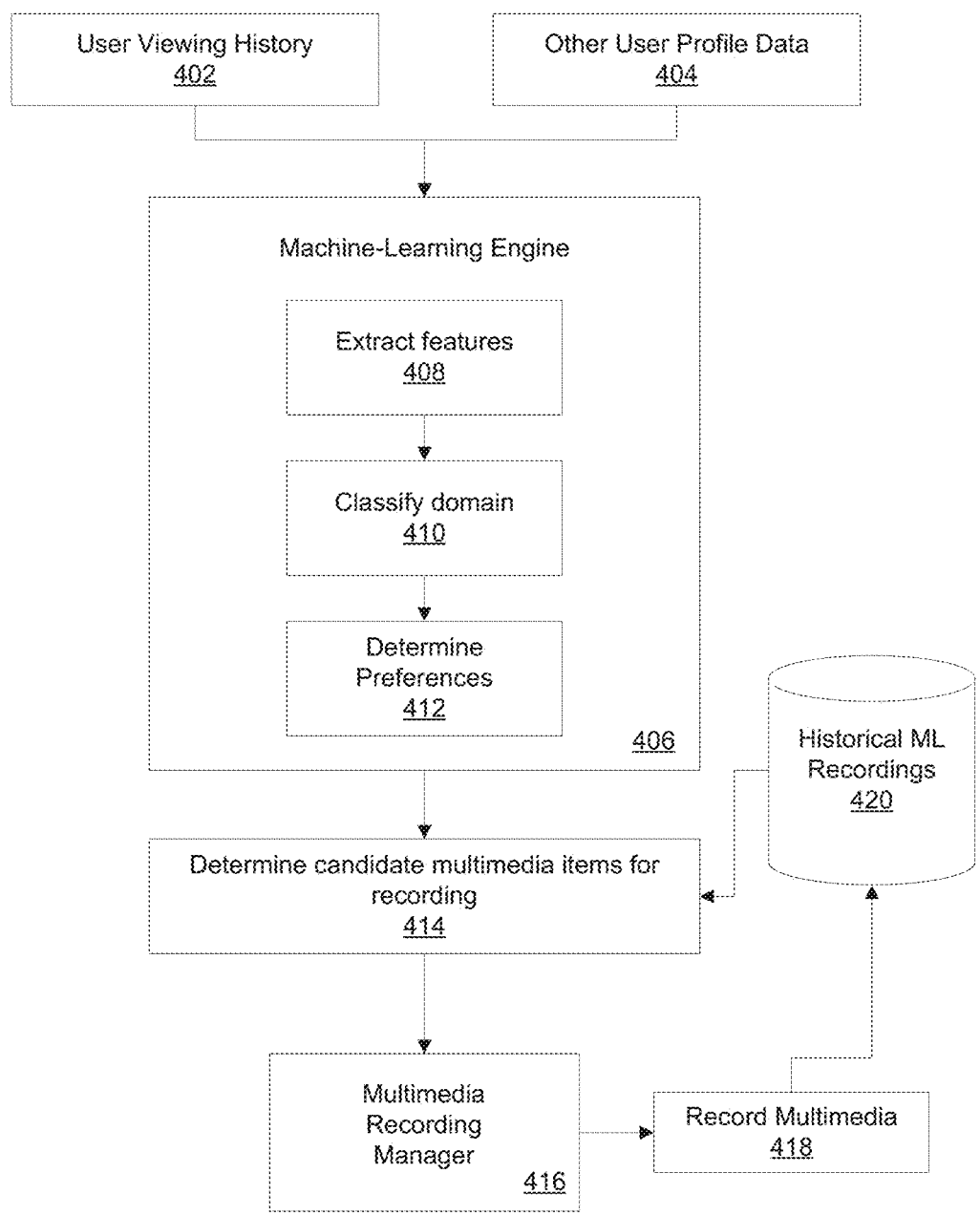
FIG. 4 illustrates an example system for recording and storing multimedia items, as described herein.

FIG. 4 illustrates an example system for recording and storing multimedia items using machine learning techniques, as described herein. FIG. 4 begins at operations 420 and 404, where user viewing history 402 and other user profile data 404 are received by the multimedia recording system via a device. The data may be received by a client device and/or a remote web server device. In the instance of a remote web server (such as servers 116, 118, and/or 120), the user viewing history and user profile data may initially be collected from a client device and then transmitted via a wireless network (over network(s) 108) to a remote web server device, where the remote web server device receives the user viewing history and user profile data. The received data may be converted into particular representations that may be understood and processed by a machine utilizing machine-learning algorithms (E.g., ML Engine 406) to intelligently disassemble the user viewing history and other user profile data and record the most relevant multimedia items for the user.

The user viewing history 402 and other user profile data 404 may be transmitted to Machine-Learning (ML) Engine 406, where the data may be used to train at least one ML model and/or compared against an already-trained ML model or models. Other user profile data 404 may comprise data from a user's social media account, user responses to a profile survey, and/or data from other sources. In some aspects, the first operation in ML Engine 406 may be extract features 408. At operation 408, certain features may be extracted from the user viewing history data 402 and other user profile data 404, including but not limited to contextual features and lexical features. For instance, the lexical features that may be analyzed include, but are not limited to, word n-grams that may appear in a social media status update, text messages, emails, and/or other text-based medium hosting user profile data. A word n-gram is a contiguous sequence of n words from a given sequence of text. For instance, a particular social media update earlier in the day from the user may state: "The new Avengers movie was awesome!" The word n-gram that may be extracted in this instance is "Avengers movie was awesome." The intelligent multimedia recording system now knows that the user enjoyed a movie with an action genre and particular actors and actresses, and therefore, the system may record future multimedia items that include similar genres and actors/actresses. As should be appreciated, analyzing word n-grams may allow for a deeper understanding of the user and therefore provide more accurate and intelligent multimedia item recordings and suggestions for recordings. The machine-learning algorithms from ML Engine 406 may be able to compare thousands of n-grams, lexical features, and contextual features in a matter of seconds to extract the relevant features of a social media, text, and/or email message. Such rapid comparison are impossible to employ manually.

The contextual features that may be analyzed at operation 408 may include, but are not limited to, a top context and an average context. A top context may be a context that is determined by comparing the topics and keywords associated with a particular multimedia item and/or text-based input (e.g., social media update, text message, email, search engine inquiry, etc.) to a set of preloaded contextual cues. An average context may be a context that is determined by comparing the topics and keywords of historically processed text-based input data, historical viewing history, the user's level of enjoyment of historically selected multimedia item recordings, user profile data (E.g., scraped from publicly facing social media websites), and other data. The feature extraction operation 408 may also skip contextually insignificant data when analyzing the input data. For example, a string token in a message input may be associated with articles, such as "a" and "an." Because articles are typically insignificant in the English language the feature extraction operation 408 may ignore these article tokens.

In other examples, the user viewing history 402 may comprise video metadata associated with the past-viewed multimedia items. Such metadata may include but is not limited to: director, writer, actors, actresses, date of release, runtime, genre, MPAA film rating, plot summary and storyline, plot keywords, episode number, series information, and critic reviews and ratings, among other data points. ML Engine 406 may be configured to not only process text-based data, but also process image and video data. At operation 408, features that may be extracted from a multimedia item may include but are not limited to faces, settings, and other objects. Objects may be identified at operation 408 by applying an image recognition algorithm stored within ML Engine 406. The image recognition algorithm may be able to identify objects, such as actors and actresses, geographic locations, settings, and points of interest, among other examples. Similarly, ML Engine 406 may be configured to identify objects in images and multimedia files from a user's social media profile and further determine a user's preferences.

Once the features are extracted at operation 408, the domain of the input data (user viewing history 402 and other user profile data 404) may be classified at operation 410. The features that were extracted at operation 408 may be grouped together into specific classifiers for further analysis at operation 410. Specifically, classifying the domain of the extracted features at operation 410 may utilize statistical models or predefined policies (i.e., prior knowledge, historical datasets) to determine the proper domain of classification. For example, if a user previously watched a Hallmark movie associated with a specific holiday, one of the features that may have been extracted at operation 408 was a holiday object (from the movie title, summary, and/or images of the background environment during the movie, etc.) and/or word n-gram describing "Halloween movies." At operation 410, the particular holiday (e.g., "Halloween") may be associated with a broader domain classification such as a "holiday" domain, in which movies with holiday themes generally may be classified.

At operation 412, the preferences of the user may be determined. For example, historical user viewing history may indicate that the user does not frequently watch romantic comedy movies or television shows, so the multimedia recording system described herein may assume that the likelihood of a user wanting to watch a recorded Rom-Com is low. Considering the user profile data 404 and the features extracted at operation 408 (e.g., via public social media postings), however, might reveal that the user is currently dating a person that enjoys romantic comedies. Further, the data extracted from the user profile data indicates that the user and the user's partner may have an upcoming "movie night" date scheduled. As such, the immediate preferences of the user to record a romantic comedy may increase, and the multimedia recording system may determine that recording a Rom-Com movie prior to the "movie night" date is likely preferred by the user.

In other examples, a user may indicate that he/she has a favorite sports team. The ML Engine 406 may determine which team that is based on user viewing history 402 and other user profiled data 404. As a result, the multimedia recording system may not only record particular games in which the team is playing, but also television shows/documentaries that may be about that particular sports team (e.g., a highlight reel of the sports team on ESPN). It should be appreciated that multiple preferences may be predicted at operation 412.

After the features are extracted at operation 408, domains classified at operation 410, and preferences determined at operation 412, the system may determine which candidate multimedia items should be recorded at operation 414. Continuing from the earlier "Halloween" example, a user's viewing history may demonstrate that the user has been frequently watching Halloween-themed multimedia. The possible domain classification for a Halloween-themed movie may be "holiday." As such, other multimedia items that are classified as "holiday" domains may be more relevant to the user. Specifically, if the user enjoyed viewing Halloween-themed Hallmark movies around the time of late October, then the multimedia recording system may determine that the user is likely to enjoy Christmas-themed Hallmark movies around the time of December, and the system may preemptively record those movies for the user to view in the future.

Additionally, at operation 414, the multimedia items that are ultimately decided to be recorded may be determined using historical recordings from the Historical ML Recordings database 420. For instance, certain recordings that were viewed by the user may be notated in database 420, and recordings that were ignored (not viewed) by the user may be notated in database 420, as well. The multimedia items that were viewed and enjoyed by the user may further help determine the candidate multimedia items to be recorded at step 414.

After candidate multimedia items are selected at operation 414, the method proceeds to multimedia recording manager 416, where the candidate multimedia items are identified and determined when to be recorded. For example, multimedia recording manager may use the steps from FIG. 2 to determine the most efficient time to record a multimedia item, considering such factors as tuner utilization, EPG data, storage capacity, and other data. The multimedia recording manager 416 determines when the candidate multimedia items selected at step 414 will ultimately be recorded. If a candidate multimedia item is airing during primetime and also again in the early morning hours, the multimedia recording manager 416 may determine that the best time to record the multimedia item is the early morning hours and schedule the recording process to take place at that time, rather than during primetime.

Once the recording of the multimedia item(s) is established by the recording manager 416, the multimedia item(s) is recorded at step 418. The recording is then subsequently stored in Historical ML Recordings database 420 for future reference (e.g., in determining the candidate multimedia items for recording at step 414). Once a multimedia item is recorded, a notification may be provided to the user, indicating that the multimedia recording system recorded a particular program that the user may be interested in viewing.

Figure 5:
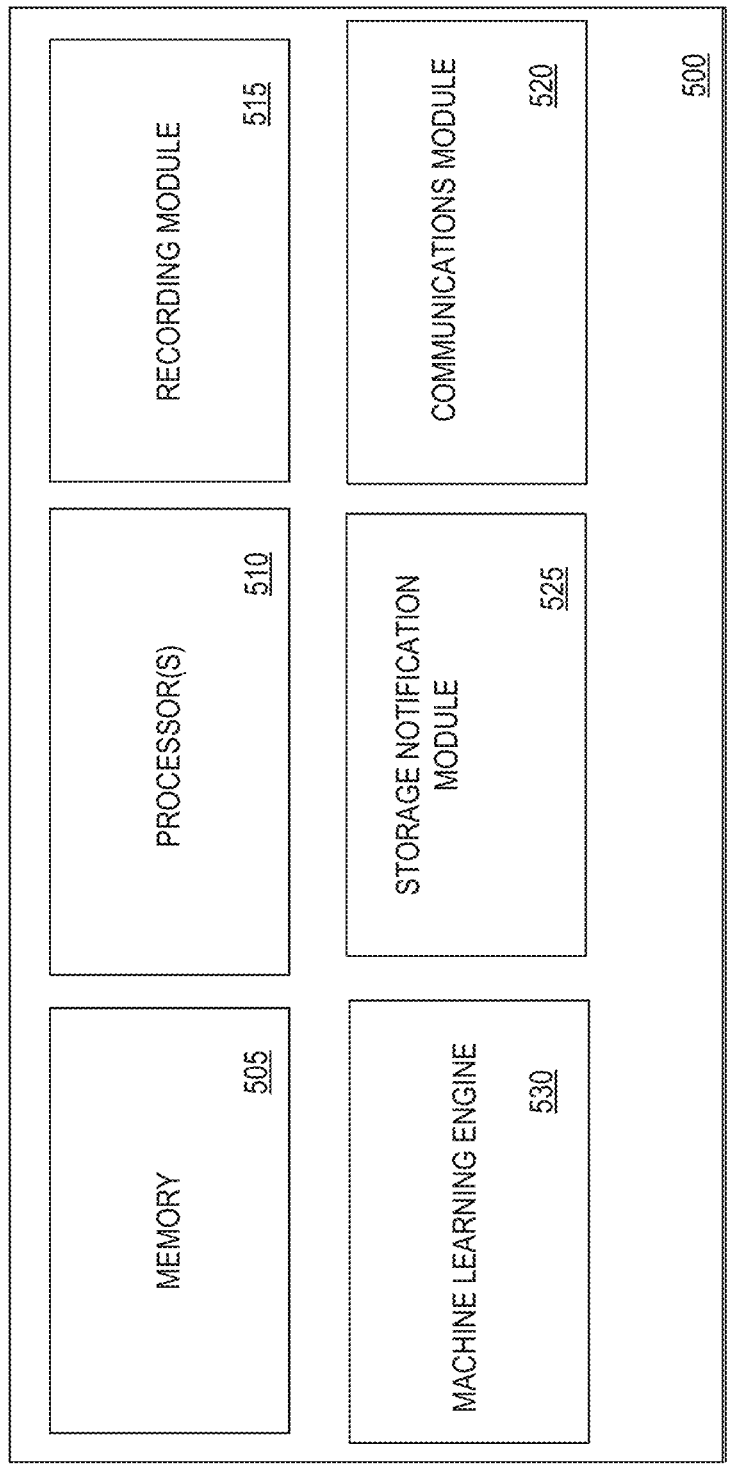
FIG. 5 illustrates an example input processor that is configured to implement the systems and methods described herein.

FIG. 5 illustrates an example input processor that is configured to implement the systems and methods described herein. Input processing system 500 may be embedded within a client device (E.g., client devices 102, 104, and/or 106), remote web server device (E.g., devices 116, 118, and/or 120), set-top boxes, televisions, smart televisions, and other devices capable of recording multimedia items. The input processing system contains one or more data processors and is capable of executing algorithms, software routines, and/or instructions based on processing data provided by a variety of sources related to the selection of a multimedia item for recording (e.g., intelligently via an ML algorithm and/or manually by a user). The input processing system can be a factory-fitted system or an add-on unit to a particular device. Furthermore, the input processing system can be a general-purpose computer or a dedicated, special-purpose computer. No limitations are imposed on the location of the input processing system relative to a client, remote web server device, television, set-top box, etc. According to embodiments shown in FIG. 5, the disclosed system can include memory 505, one or more processors 510, recording module 515, communications module 520, storage notification module 525, and machine learning engine 530. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 505 can store instructions for running one or more applications or modules on processor(S) 510. For example, memory 505 could be used in one or more embodiments to house all or some of the instructions needed to execute the functionality of recording module 515, communications module 520, storage notification module 525, and ML Engine 530. Generally, memory 505 can include any device, mechanism, or populated data structure used for storing information. In accordance with some embodiments of the present disclosures, memory 505 can encompass, but is not limited to, any type of volatile memory, nonvolatile memory, and dynamic memory. For example, memory 505 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 505 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 505.

Recording module 515 may be configured to run a portion of the operation steps described in FIGS. 2-4, particularly scheduling and executing the recording of a multimedia item or items. Module 515 may receive a command from a user to record a particular multimedia item; the command may be received via a client device, remote, verbal command, gesture, etc. In other instances, recording module 515 may receive a command from the multimedia recording system described herein (e.g., operation 316) to record a particular multimedia item or items. It should be appreciated that recording module 515 is configured to communicate with communications module 520, storage notification module 525, and ML engine 530. Any of these components may initiate a command to the recording module 515 to begin or stop a recording of a multimedia item or items.

Communications module 520 is associated with sending/receiving information (e.g., collected and classified by the ML engine 530, commands received via client devices or remotes, etc.) with other client devices, remote web servers, set-top boxes, televisions, remotes, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 520 sends information received by recording module 515 to storage notification module 525 and ML Engine 530. In other examples, communications module 520 may communicate a command to recording module 515 that is received from a client device, remote web server, remote, television, and/or other mechanism initiating a command to record or stop a recording of a multimedia item or items.

Storage notification module 525 is configured to communicate with storage drives, such as DVRs, local databases stored on client devices (e.g., local databases 110, 112, and/or 114), and/or remote web server databases (e.g., databases 116, 118, and/or 120). Storage notification module 525 is configured to communicate with recording module 515, predictively assess the storage capacity of the multimedia item(s) to be recorded, and compare that predictive storage capacity to the current storage status of the relevant devices (client, remote, DVR, etc.). If the predicted storage capacity of the multimedia item selected to be recorded will likely place the storage capacity of a particular database over a maximum limit, the storage notification module 525 may provide a storage notification to the user. The storage notification may indicate to the user how much remaining storage is currently left on a particular device and how much storage might remain if the particular multimedia item is recorded. Additionally, storage notification module 525 may communicate with ML Engine 530 and provide intelligent recommendations to the user regarding which already-recorded multimedia items should be deleted to free up storage space for new multimedia items.

ML Engine 530 may be configured to receive user viewing history and other user profile data to train at least one machine-learning model or compare against an already-trained machine-learning model. For example, to train the ML model(s), the extracted features of the input data may be associated with specific multimedia identifiers (e.g., director, writer, genre, geography, actor/actresses, etc.). The ML engine 530 may utilize various machine learning algorithms to train the ML model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other supervised and unsupervised machine learning algorithms. The aforementioned machine learning algorithms may also be applied when comparing input data to an already-trained machine learning model. Based on the identified and extracted multimedia features and patterns (e.g., user viewing patterns), ML engine 530 may select the appropriate machine learning algorithm to apply to the multimedia features to train the at least one machine learning model. For example, if the received multimedia features are complex and demonstrate non-linear relationships, then ML engine 530 may select a bagging and random forest algorithm to train the machine learning model. However, if the multimedia features demonstrate a linear relationships to certain multimedia features and input data, then ML engine 530 may apply a linear or logistic regression algorithm to train the machine learning model.

In other aspects, ML engine 530 may apply at least one already-trained machine learning model to the received multimedia features from the past user viewing history and other user profile data to detect previously identified and extracted multimedia features (e.g., certain actors the user may enjoy watching in movies or television shows) and previously recognized patterns (e.g., user enjoys holiday-themed Hallmark movies). ML engine 530 may be configured to compare at least one trained machine learning model to the received input data to generate comparison results that indicate which multimedia items should be recorded in the future based on the user's preferences. Specifically, ML engine 530 may compare the identified and extracted multimedia features of the multimedia items from the user viewing history that are associated with specific multimedia identifiers. ML engine 530 is also configured to generate comparison results, indicating the similarity (or lack thereof) between certain multimedia assets on which the machine learning model was trained and the received multimedia features. In other aspects, the comparison results may include a confidence indicator, which may indicate how confident the system may be that a candidate multimedia item is relevant to the user. For instance, based on the user viewing history and other user profile data, a confidence score may be assigned to certain candidate multimedia items to be recorded. Further considering current storage capacities, candidate multimedia items that are scored with a confidence indicator above a certain threshold may be recorded, whereas those below the threshold may not be recorded (e.g., multimedia items with an "8/10" or higher on the confidence score may be recorded, but if more storage is freed up, then items with "7/10" score or higher may be recorded). It should be appreciated that ML engine 530 is configured to communicate with recording module 515, communications module 520, and storage notification module 525. In particular, ML engine 530 may transmit a request to record a certain multimedia item to recording module 515 based on the results of at least one machine-learning algorithm process, as described in FIG. 3, for example.

In other embodiments, input processing system 500 may be designed in a multi-state configuration and include more than one machine learning engine 530. In such embodiments, a first machine learning engine may be trained to recognize one type of media entity (E.g., character feature, face, setting, backdrop, director, writer, genre, plot keyword, character voice, etc.), and a second machine learning engine may be trained to recognize another type of media entity. For example, one machine learning engine may be trained to recognize particular actors and actresses based on facial recognition techniques and/or voice recognition analyses.

Another machine learning engine may be trained to recognize backdrops and settings from the frames of a movie or television show. Another machine learning engine may be trained to read text-based metadata associated with a multimedia item. In other aspects, multiple machine learning engines may be distributed within the input processing system 500. A multi-state configuration allows for multiple machine learning engines to process data simultaneously, thereby increasing processing power and speed, which may translate to more accurate and relevant multimedia item recordings and/or suggestions for recordings to the user. The comparison results generated by each machine learning engine in a multi-state configuration may be aggregated prior to determining exactly which candidate multimedia items should be recorded for future viewing by a user.

FIG. 6 illustrates an example electronic program guide indicating scheduled recordings based on the systems and methods disclosed herein. Electronic programming guide 600 displays various channels and times. Time break 606 indicates a separation between 6:30 pm and 11:00 pm. As can be seen from the illustration, Program A 604 and Program A 602 appear on the same channel, Channel C but are airing at different times. Program A 604 is airing at 6:30 pm, whereas Program A 602 is airing at 12:00 am (midnight). If a user manually selects to record Program A, then the multimedia recording system described herein may intelligently select to record the 12:00 am airing of Program A 602 instead of the 6:30 pm airing of Program A 604. The decision-making process of whether to record program A 604 or Program A 602 may consider factors such as tuner utilization, storage capacity, EPG data, user viewing patterns, and other data points. For instance, a user's viewing patterns may indicate that a user typically does not watch live television at 6:30 pm but frequently watches television at 12:00 am. As such, the multimedia recording system described herein may select to record Program A at 6:30 pm instead of Program A at 12:00 am in order to better ensure a lower tuner utilization rate at the time of recording.

Figure 7:
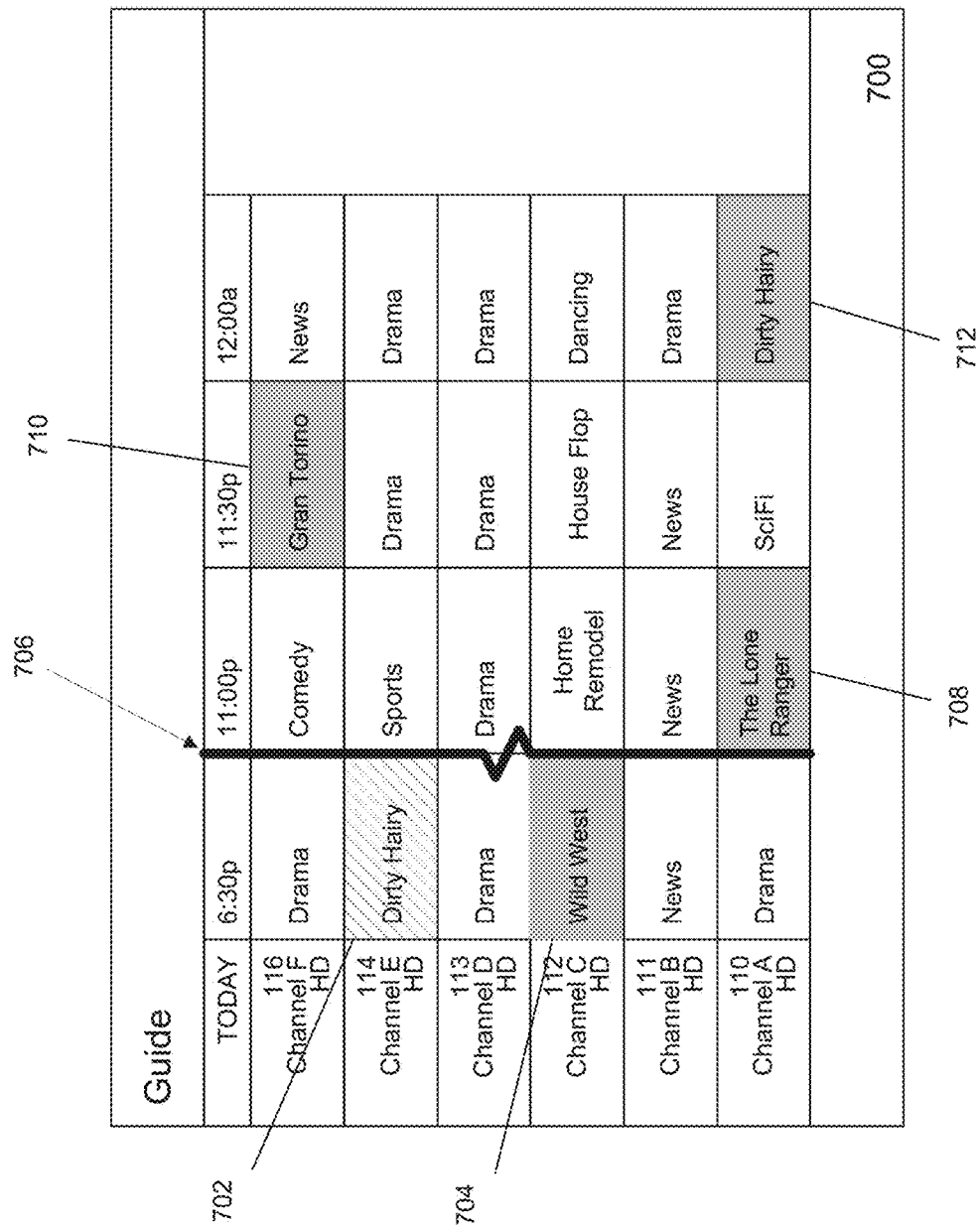
FIG. 7 illustrates an example electronic program guide indicating schedule recordings of particular genres based on the systems and methods disclosed herein.

FIG. 7 illustrates an example electronic program guide indicating schedule recordings of particular genres based on the systems and methods disclosed herein. Electronic Programming Guide 700 displays various programs and channels airing at different times with time break 706 separating 6:30 pm from 11:00 pm (i.e., includes all the shows and times in between but not illustrated for brevity). A user may request to record certain programs that are associated with a particular genre and/or actor. For instance, a user may request to record programs of a "Western" genre or have "Clint Eastwood" as an actor. The multimedia recording system may intelligently analyze the EPG data displayed in EPG 700 and determine that programs 702, 704, 708, 710, and 712 may fall into that category. However, the multimedia recording system may determine that programs 702 and 712 are duplicative and decide to record only one of them. Because another western program (Wild West 704) is airing at the same time as Dirty Hairy 702, the system may elect to record Dirty Hairy 712 instead of Dirty Hairy 702, so as to ensure a lower tuner utilization rate. If both Dirty Hairy 702 and Wild West 704 were to be recorded simultaneously at 6:30 pm, then two tuners on a set-top box may be required. If a user only has two tuners on the set-top box, then if the user wanted to watch a live television program that was not programs 702 or 704, the user would be unable to do so because tuner utilization would be maxed out in this situation.

The multimedia recording system is also able to intelligently identify preferred actors. As illustrated in FIG. 7, program 710 is a movie that is not a "Western" genre but nonetheless still includes Clint Eastwood as an actor. Because a user may request to broadly record programs according to genre, actor, or a combination of both, the multimedia recording system described herein may be intelligent enough to recognize that Program 710 should be recorded upon a request to record both Western genre multimedia items and multimedia items starring Clint Eastwood. In another example, a user may have only requested that Western genre movies be recorded. The multimedia recording system may rely on at least one machine-learning model to determine that based on the user's current request and past user viewing history, that Program 710 may also be recorded. Considering that no other "western" movies are airing at 11:30 pm, the multimedia recording system may select program 710 to record in addition to the Western-genre multimedia items.

Figure 8:
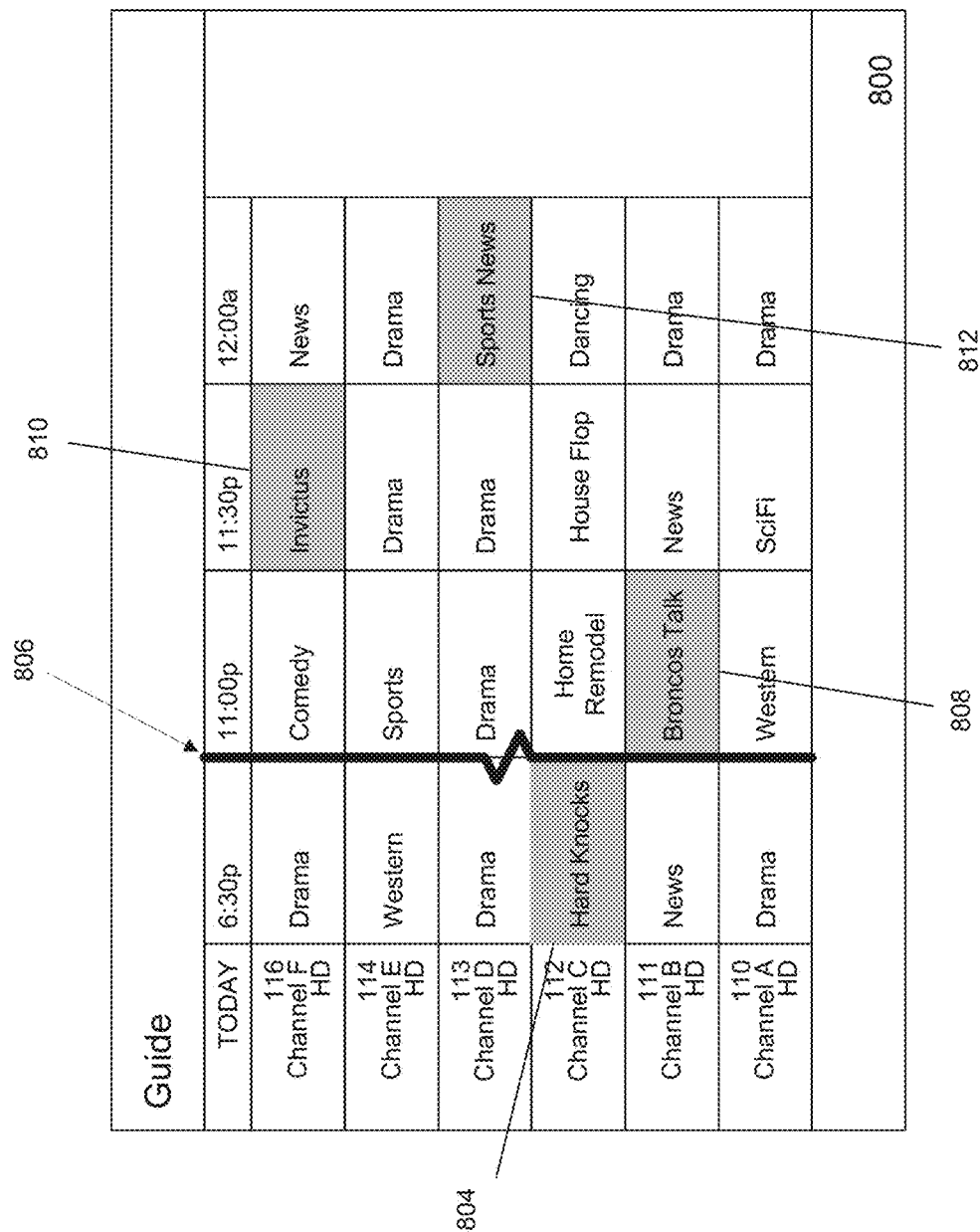
FIG. 8 illustrates an example electronic program guide indicating scheduled recordings based on at least one machine learning model, as described herein.

FIG. 8 illustrates an example electronic program guide indicating scheduled recordings based on at least one machine learning model, as described herein. FIG. 8 illustrates an Electronic Programming Guide 800 with various channels, times, and programs. Based on a user's past viewing history and other user profile data (per FIG. 3 and ML Engine 430), the multimedia recording system may intelligently select to record programs 804, 806, 808, 810, and 812. For instance, if a user's social media profile indicates that the user is a Denver Broncos football fan, then the show "Broncos Talk" program 808 may be intelligently recorded based on at least one ML model determining that program 808 would be relevant to the user's viewing preferences. Furthermore, because the user is a Denver Broncos fan, the user may be interested in a broader classification of "sports" multimedia items. As such, the multimedia recording system may elect to record program 804, movie 810, and program 812, since each of these multimedia items are associated with "sports" domains (and programs 810 and 804 associated more specifically with a "football" domain).

FIG. 9 illustrates an example electronic program guide and a predictive storage notification, as described herein. FIG. 9 displays EPG 900 with program A 902 selected as a multimedia item to record. However, upon selection of program A 902 to record, a predictive storage notification 904 may display, informing the user that program A is already available to view on-demand through another multimedia source (e.g., On-Demand through DVR, Internet-streaming service, etc.). A user may acknowledge the notification 904 and decline to record program 902, or the user may dismiss the notification 904 and proceed to record program 902. The predictive storage notification 904 may be generated via storage notification module 525, as described with respect to FIG. 5.

Figure 10:
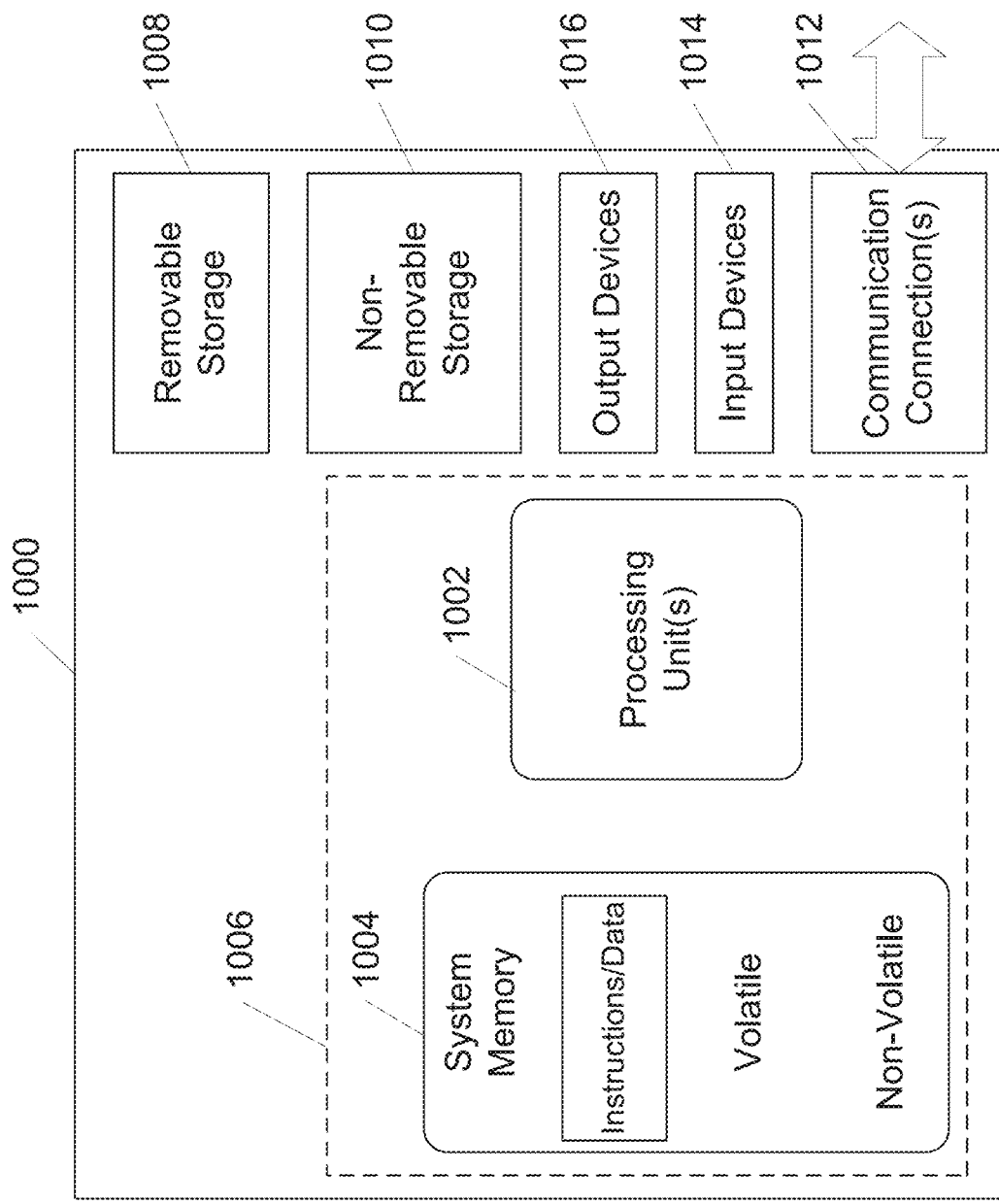
FIG. 10 illustrates one example of a suitable operating environment in which one or more of the present embodiments may be implemented.

FIG. 10 illustrates one example of a suitable operating environment 1000 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 typically includes at least some form of computer readable media. Computer readable media can be any available media that can be accessed by processing unit 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for multi-source recording of content, comprising:
   a memory configured to store non-transitory computer readable instructions; and
   a processor communicatively coupled to the memory, wherein the processor, when executing the non-transitory computer readable instructions, is configured to:
   receive past multimedia viewing history, wherein the past multimedia viewing history comprises a first plurality of multimedia features;
   receive program data identifying a plurality of programs, wherein at least one multimedia program of the plurality of programs comprises a second plurality of multimedia features;
   process the at least one multimedia program using at least one machine-learning algorithm, wherein the at least one machine-learning algorithm compares the first plurality of multimedia features to the second plurality of multimedia features;
   based on the comparison of the first plurality of multimedia features to the second plurality of multimedia features, generate at least one confidence score for the at least one multimedia program; and
   based on the at least one confidence score exceeding a confidence threshold, record the at least one multimedia program after a content-specific cross-checking of the at least one multimedia program from multiple sources, wherein the content-specific cross-checking indicates an availability of the at least one multimedia program from each of the multiple sources, wherein the at least one multimedia program corresponds to a first program from a first channel and a first transmission source, wherein the first program is classified in at least one common domain;
   record a second program from a second channel and a second transmission source, wherein the second program is classified in the at least one common domain; and display the first program and the second program within a channel-specific view of a program guide that obscures or removes identification of the first transmission source and the second transmission source.

2. The system of claim 1, wherein the processor is further configured to receive a recording command, wherein the confidence score is generated only for determining the likelihood that the at least one multimedia program is relevant to the single user.

3. The system of claim 1, wherein the first plurality of multimedia features comprises at least one of: a channel, a series of shows, a group of movies, a broadcast media item, and an Internet streaming media item.

4. The system of claim 1, wherein the first plurality of multimedia features comprises at least one of: a movie, a television show, and a video clip.

5. The system of claim 1, wherein the at least one multimedia program is received from the first transmission source, wherein the transmission source is at least one of: an Internet-streaming service, a digital video recorder, and an on-demand library.

6. The system of claim 2, wherein the recording command is received from at least one of: a client device, a mobile phone, a computer, a remote, a television, a remote web server, and a set-top box.

7. The system of claim 2, wherein the recording command is received in at least one of the following formats: a mechanical input, a verbal input, a text-based input, and a gesture.

8. The system of claim 2, wherein the recording command is received from the at least one machine-learning algorithm.

9. The system of claim 1, wherein the at least one machine-learning algorithm is trained on the first plurality of multimedia features.

10. The system of claim 9, wherein the at least one machine-learning algorithm is configured to extract at least one multimedia feature from the first plurality of multimedia features, the at least one multimedia feature comprising at least one of: an actor, an actress, a genre, a geography, a timeframe, a plot summary, a plot keyword, a director, a writer, a producer, a title, a review, a rating, a MPAA rating, a series number, and an episode number.

11. The system of claim 9, wherein the at least one machine-learning algorithm is trained on the first plurality of multimedia features according to at least one of: a linear regression, a logistic regression, a linear discriminant analysis, a regression tress, a naïve Bayes algorithm, a k-nearest neighbors algorithm, a learning vector quantization, a neural network, a support vector machine (SVM), and a random forest.

12. The system of claim 8, wherein the recording command received from the at least one machine-learning algorithm is a command to record multimedia items associated with a multimedia feature, wherein the multimedia feature may comprise at least one of: a genre, an actor, an actress, a director, a producer, a writer, a time period, a geography, a rating, a review, a plot summary, and a plot keyword.

13. The system of claim 2, wherein the processor is further configured to assess, in response to receiving the recording command, current storage capacity of at least one database.

14. The system of claim 13, wherein assessing current storage capacity of at least one database further comprises providing at least one predictive notification to a display device based on a determination that the at least one database has insufficient storage capacity for storing the data corresponding to the first program or the second program.

15. The system of claim 6, wherein the processor is further configured to analyze a tuner utilization rate associated with the set-top box.

16. The system of claim 15, wherein recording the at least one multimedia program occurs at a low tuner utilization rate.

17. A method for multi-source recording of content comprising:
receiving past multimedia viewing history, wherein the past multimedia viewing history comprises a first plurality of multimedia features;
receiving program data identifying a plurality of programs, wherein at least one multimedia program of the plurality of programs comprises a second plurality of multimedia features;
processing the at least one multimedia program using at least one machine -learning algorithm, wherein the at least one machine-learning algorithm compares the first plurality of multimedia features to the second plurality of multimedia features;
based on the comparison of the first plurality of multimedia features to the second plurality of multimedia features, generating at least one confidence score for the at least one multimedia program; and
based on the at least one confidence score exceeding a confidence threshold, recording the at least one multimedia program after a content-specific cross-checking of the at least one multimedia program from multiple sources, wherein the content-specific cross-checking indicates an availability of the at least one multimedia program from each of the multiple sources, wherein the at least one multimedia program corresponds to a first program from a first channel and a first transmission source, wherein the first program is classified in at least one common domain;
recording a second program from the first channel and a second transmission source, wherein the second program is classified in the at least one common domain; and
displaying the first program and the second program within a channel-specific view of a program guide that obscures or removes identification of the first transmission source and the second transmission source.

18. The method of claim 17, wherein the at least one multimedia program is received from at least one of: an Internet-streaming service, a digital video recorder, and an on-demand library, and wherein the at least one confidence score is generated only for determining the likelihood that the at least one multimedia program is relevant to the single user.

19. The method of claim 17, further comprising: analyzing a tuner utilization rate associated with a set-top box.

20. A non-transitory computer-readable media storing computer executable instructions that when executed cause a computing system to perform a method for multi-source recording of content comprising:
receiving past multimedia viewing history, wherein the past multimedia viewing history comprises a first plurality of multimedia features;
receiving program data identifying a plurality of programs, wherein at least one multimedia program of the plurality of programs comprises a second plurality of multimedia features;
processing the at least one multimedia program using at least one machine -learning algorithm, wherein the at least one machine-learning algorithm compares the first plurality of multimedia features to the second plurality of multimedia features;

based on the comparison of the first plurality of multimedia features to the second plurality of multimedia features, generating at least one confidence score for the at least one multimedia program; and based on the at least one confidence score exceeding a confidence threshold, recording the at least one multimedia program after a content-specific cross-checking of the at least one multimedia program from multiple sources, wherein the content-specific cross-checking indicates an availability of the at least one multimedia program from each of the multiple sources, wherein the at least one multimedia program corresponds to a first program, wherein the first program is classified in a sports domain;

recording a second program, wherein the second program is classified in the sports domain; and displaying the first program and the second program within a channel-specific view of a program guide that obscures or removes identification of a transmission source.

* * * * *